United States Patent
Farooqi et al.

(10) Patent No.: US 10,737,693 B2
(45) Date of Patent: Aug. 11, 2020

(54) AUTONOMOUS STEERING CONTROL

(71) Applicant: Ford Global Technologies, LLC, Dearborn, MI (US)

(72) Inventors: Quazi Farooqi, Troy, MI (US); Xingping Chen, Troy, MI (US); Michael Hafner, Ann Arbor, MI (US); Darrel Alan Recker, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 15/862,352

(22) Filed: Jan. 4, 2018

(65) Prior Publication Data

US 2019/0202453 A1 Jul. 4, 2019

(51) Int. Cl.
*B60W 30/12* (2020.01)
*B60W 40/112* (2012.01)
*B60W 40/114* (2012.01)
*G05D 1/02* (2020.01)

(52) U.S. Cl.
CPC .......... *B60W 30/12* (2013.01); *B60W 40/112* (2013.01); *B60W 40/114* (2013.01); *G05D 1/0246* (2013.01); *G05D 1/0257* (2013.01)

(58) Field of Classification Search
CPC .. B60W 30/12; B60W 40/112; B60W 40/114; G05D 1/0246; G05D 1/0257
USPC .......................................................... 701/28
See application file for complete search history.

(56) References Cited

U.S. PATENT DOCUMENTS

| | | | |
|---|---|---|---|
| 6,675,094 B2 | 1/2004 | Russell et al. | |
| 7,034,742 B2 | 4/2006 | Cong et al. | |
| 8,855,883 B2 | 10/2014 | Park | |
| 2005/0278112 A1 | 12/2005 | Gern et al. | |
| 2011/0320163 A1* | 12/2011 | Markkula | B60W 40/072 702/150 |
| 2017/0016740 A1* | 1/2017 | Cui | G01C 21/30 |
| 2019/0168752 A1* | 6/2019 | Suzuki | G05D 1/0246 |

FOREIGN PATENT DOCUMENTS

| | | |
|---|---|---|
| CN | 105825173 A | 8/2016 |
| CN | 106529493 A | 3/2017 |

OTHER PUBLICATIONS

Llorca et al. article entitled "Vision-Based Traffic Data Collection Sensor for Automotive Applications," Sensors (Basel). 2010; 10(1): 860-875, Published online Jan. 22, 2010. doi: 10.3390/s100100860, PMCID: PMC3270873, © 2010 by the authors; licensee Molecular Diversity Preservation International, Basel, Switzerland, printed Sep. 18, 2017.

* cited by examiner

*Primary Examiner* — Krishnan Ramesh
(74) *Attorney, Agent, or Firm* — Frank A. MacKenzie; Bejin Bieneman PLC

(57) ABSTRACT

A system and a method are described. The method includes: receiving sensed input from a vehicle sensor suite; using the input, providing a first output; determining that a vehicle-lane confidence level is less than a threshold; and then instead, providing a second output, wherein the first and second outputs comprise lane-correction data, wherein the second output is determined using an estimation filter.

19 Claims, 8 Drawing Sheets

AUTONOMOUS STEERING CONTROL

BACKGROUND

A modern automobile may be configured with a lane-centering feature. In some instances when using the feature—and based on a change in roadway conditions—the automobile unexpectedly may move or jump laterally.

DETAILED DESCRIPTION

Figure 1:
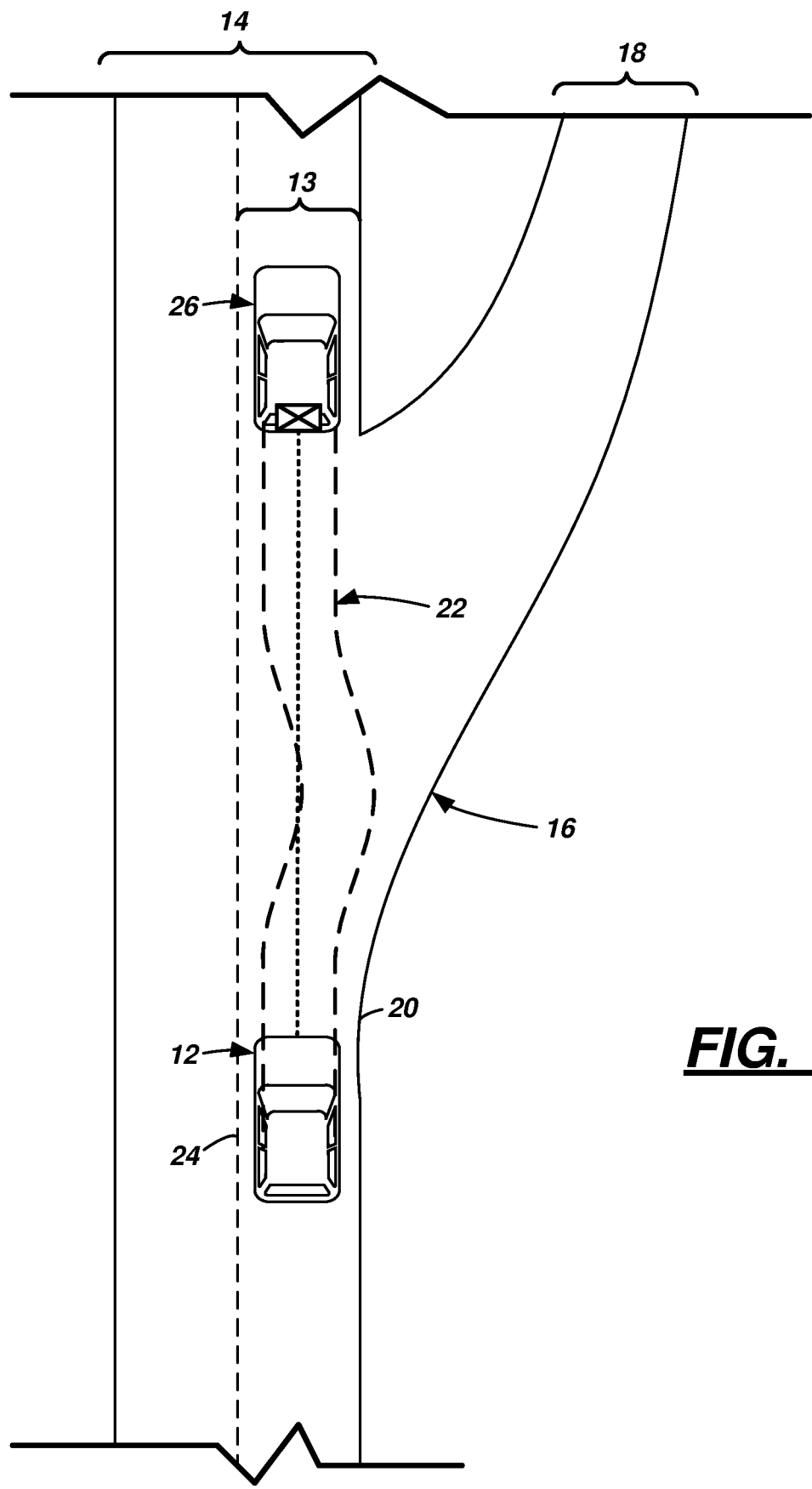
FIG. 1 is a schematic diagram illustrating a host vehicle predicting a lateral movement due at least in part to an absence of a right lane marker.

A steering control system for a vehicle is described that may include a computer and a lateral controller. In addition, methods are described utilizing the system. In at least one example, the method(s) may be executed by the computer, the lateral controller, or both. According to one illustrative example, a method includes: receiving sensed input from a vehicle sensor suite; using the input, providing a first output; determining that a vehicle-lane confidence level is less than a threshold; and then instead, providing a second output, wherein the first and second outputs comprise lane-correction data, wherein the second output is determined using an estimation filter.

According to the at least one example set forth above, the input comprises radar data and camera data.

According to the at least one example set forth above, the radar and camera data are fused into a single representation that comprises lane markers on a roadway.

According to the at least one example set forth above, the first output is determined by calculating coefficients for a curve-fitting polynomial.

According to the at least one example set forth above, the filter is a Kalman filter.

According to the at least one example set forth above, the filter determines the second output using a bicycle model.

According to the at least one example set forth above, the model uses vehicle yaw rate, vehicle speed, and a roadway curvature measurement.

According to the at least one example set forth above, determining the level further comprises analyzing the input to determine an identification status of: a right lane marker on a roadway, a left lane marker on the roadway, a primary object moving on the roadway, or a combination thereof.

According to the at least one example set forth above, determining that the level further comprises determining that a status of one or more of the right lane marker, the left lane marker, or the object has changed between a detected status and an undetected status.

According to the at least one example set forth above, the first output is provided when the statuses of each of the right lane marker, the left lane marker, and the primary object is detected.

According to the at least one example set forth above, the second output is provided when the statuses of one or more of: the right lane marker, the left lane marker, and the primary object is undetected.

According to the at least one example set forth above, the level is based on an identification within the input of: a right lane marker, a left lane marker, a primary object moving on a roadway, a combination thereof, or an absence of one or more of: the right lane marker, the left lane marker, or the object.

According to the at least one example set forth above, the data comprises a lateral offset measurement and a heading offset measurement.

According to the at least one example set forth above, the input comprises camera data at a host vehicle, wherein the level is less than the threshold based on a change in gain or contrast in the camera data.

According to the at least one example set forth above, the change is based on at least one of: the vehicle moving, on a roadway, between a shadowed region and an unshadowed region; a right lane marker or a left lane marker, on the roadway, terminating; one of the right lane marker or the left lane marker diverging from parallel; or a presence of markings on the roadway other than lane markers.

According to the at least one example set forth above, the markings comprise roadway repairs or patches.

According to another illustrative example, a system is described. The system may comprise: a processor; and memory storing instructions executable by the processor, the instructions comprising, to: receive sensed input from a vehicle sensor suite; using the input, provide a first output; determine that a vehicle-lane confidence level is less than a threshold; and then instead, provide a second output, wherein the first and second outputs comprise lane-correction data, wherein the second output is determined using an estimation filter.

According to the at least one example set forth above, the first output is determined by calculating coefficients for a curve-fitting polynomial.

According to the at least one example set forth above, determining the level further comprises analyzing the input to determine an identification status of: a right lane marker on a roadway, a left lane marker on the roadway, a primary object moving on the roadway, or a combination thereof.

According to the at least one example set forth above, the filter determines the second output using a bicycle model, wherein the model uses vehicle yaw rate, vehicle speed, and a roadway curvature measurement.

According to the at least one example, a computer is disclosed that is programmed to execute any combination of the examples of the method(s) set forth above.

According to the at least one example, a computer program product is disclosed that includes a computer readable medium that stores instructions executable by a computer processor, wherein the instructions include any combination of the examples of the method(s) set forth above.

Turning now to the figures wherein like reference numerals denote like or similar elements, features or functions, a steering control system 10 for a host vehicle 12 operating in an autonomous driving mode is shown that can control vehicle steering based on polynomial path data and estimation path data. Thus, using either type of data, system 10 controls vehicle 12 so that it is properly positioned in a lane 13 of a roadway 14 (e.g., by maintaining an adequate lateral spacing between right and left lane markers). According to a default state, the system 10 may be configured to use polynomial path data to maintain the lateral spacing. However, when the steering control system determines that a vehicle-lane confidence level drops below a threshold, the system 10 may utilize the estimation path data instead until the confidence level increases again to a value above the threshold. As will be explained more below, system 10 may receive at least one input from one or more imaging sensors onboard the vehicle 12 and may use this input to determine the polynomial path data. As also will be explained in greater detail below, system 10 concurrently may use a so-called bicycle model and a mathematical low-pass estimation filter to determine the estimation path data. Among other things, the bicycle model may receive as input roadway curvature measurements (e.g., using the input from the imaging sensors), as well as vehicle yaw rate measurements and vehicle speed measurements. According to one example, the filter comprises a joint probability distribution algorithm such as a Kalman filter. Following an exemplary description of the steering control system 10, one or more methods of using the system will be described.

Figure 2:
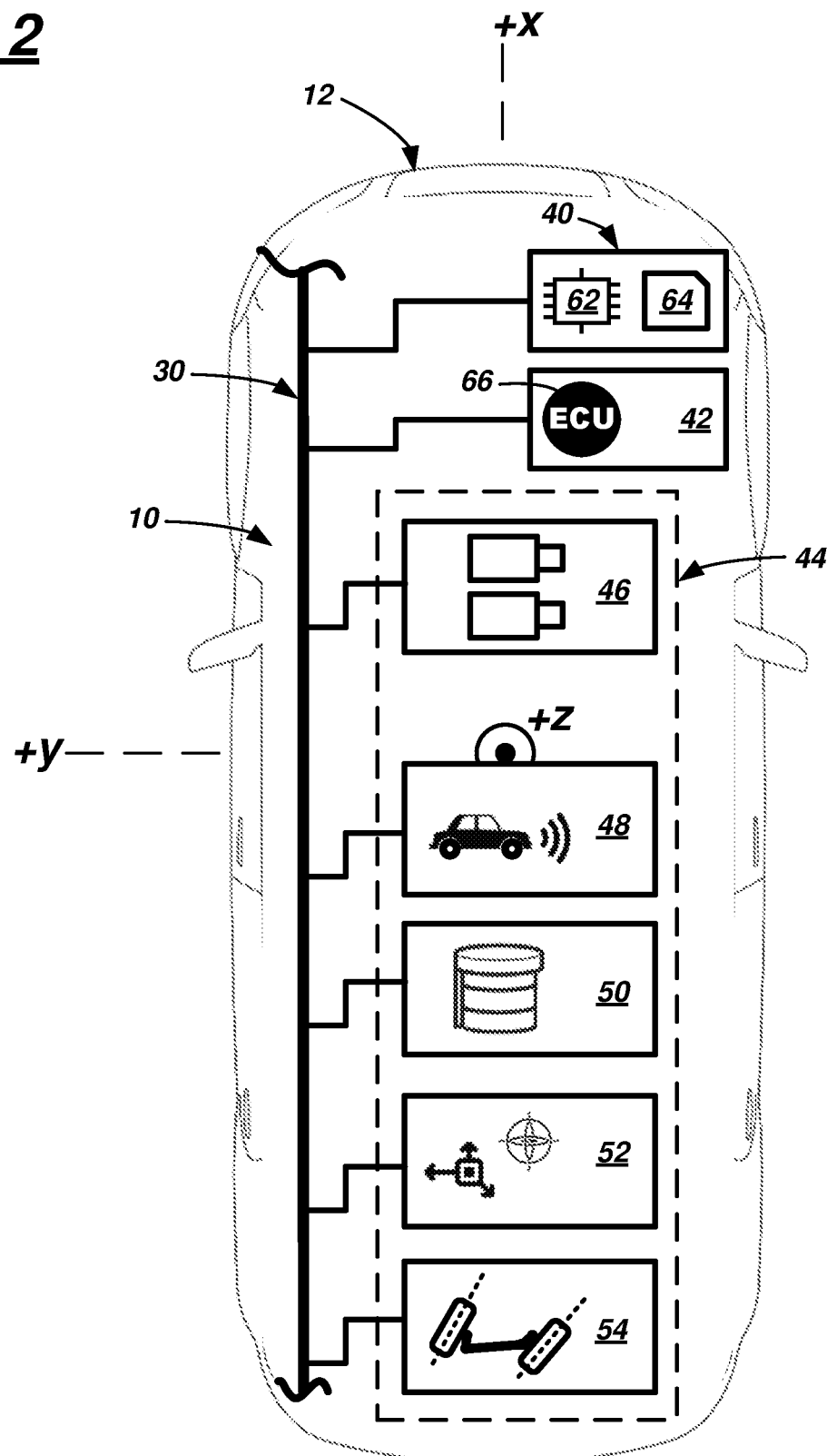
FIG. 2 is a schematic diagram of a steering control system of the host vehicle.

FIGS. 1-2 illustrate host vehicle 12 as a passenger vehicle; however, vehicle 12 could be any other suitable vehicle type, including a truck, a sports utility vehicle (SUV), a recreational vehicle, a bus, or the like that comprises the steering control system 10. For purposes of illustration and explanation only, vehicle 12 is shown oriented along a Cartesian coordinate system, wherein an x-axis extends longitudinally or along a length of vehicle 12 (and rotations about the x-axis constitute vehicle roll), a y-axis extends transversely or about a width of vehicle 12 (and rotations about the y-axis constitute vehicle pitch), and a z-axis extending vertically (and rotations about the z-axis constitute vehicle yaw).

System 10 may facilitate operation of the vehicle 12 in one or more autonomous modes, as defined by the Society of Automotive Engineers (SAE) (which has defined operation at levels 0-5). More particularly (and as described in greater detail below), system 10 may comprise one or more computers configured to store and execute logic instructions or sets of instructions embodied in hardware, software, firmware, a combination thereof, or the like to thereby enable vehicle 12 to operate with some user assistance (partial autonomy) or without any user assistance (full autonomy). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), vehicle 12 sometimes assists with steering, acceleration, or braking, but the driver is still responsible for the vast majority of the vehicle control. At level 2 ("partial automation"), vehicle 12 can control steering, acceleration, and braking under certain circumstances without human interaction. At levels 3-5, vehicle 12 assumes more driving-related tasks. At level 3 ("conditional automation"), vehicle 12 can handle steering, acceleration, and braking under certain circumstances, as well as monitoring of the driving environment. Level 3 may require the driver to intervene occasionally, however. At level 4 ("high automation"), vehicle 12 can handle the same tasks as at level 3 but without relying on the driver to intervene in certain driving modes. At level 5 ("full automation"), vehicle 12 can handle all tasks without any driver intervention. In at least one example, the steering control mode of vehicle 12 includes operation of the vehicle at one of SAE levels 3, 4, or 5.

FIG. 1 illustrates one problem with which steering control system 10 is configured to avoid. Namely, in FIG. 1, vehicle 12 (while operating in an autonomous mode in lane 13) approaches an entrance 16 to an exit lane 18 and a right lane marker 20 diverges radially outwardly (and in some cases, may disappear). In a scenario wherein vehicle 12 was steering using only polynomial path data, the vehicle might follow vehicle path 22 which veers or jumps unexpectedly laterally. Steering system 10 however supplements use of polynomial path data with estimation path data, as will be explained more below. For example, system 10 is configured first to detect a drop in a vehicle-lane confidence level when the right lane marker 20 or other lane-positioning indicia become unidentifiable, and then use—at least temporarily—calculated estimation path data to avoid the illustrated unexpected lateral jump. As used herein, lane-positioning indicia means objects or lane markers which, when imaged by a vehicle sensor suite (discussed below) with sufficient resolution, gain, contrast, etc., can be used by an onboard computer of vehicle 12 to laterally navigate vehicle 12 on roadway 14 and/or within lane 13. Non-limiting examples of lane indicia include right lane marker (RLM) 20, a left lane marker (LLM) 24, and a primary object 26 (e.g., such as the target vehicle shown driving in front of vehicle 12).

FIG. 2 illustrates that system 10 may comprise a communication network connection 30 facilitating wired or wireless communication between a number of exemplary electronic devices, including but not limited to a computer 40, a lateral controller 42, and a sensor suite 44. Sensor suite 44 may comprise one or more of: a camera system 46, a radio detection and ranging (radar) system 48, a laser imaging system 50, one or more inertial measurement units (IMUs) 52, and one or more steering control sensors 54.

Connection network 30 may include one or more of a controller area network (CAN) bus, Ethernet, Local Interconnect Network (LIN), a fiber optic connection, or the like—just to name a few non-limiting examples. According to one example, which may be used alternatively or in combination with the illustrated bus example, connection 30 comprises one or more discrete wired or wireless connections.

Computer 40 may comprise at least one processor 62 (one is shown) and memory 64. Processor 62 may be programmed to process and/or execute digital instructions to carry out at least some of the tasks described herein. Non-limiting examples of processor 62 include a microprocessor, a microcontroller or controller, an application specific integrated circuit (ASIC), etc.—just to name a few. And a few non-limiting examples of digitally-stored instructions—storable in memory 64 and executable by processor 62—include, to: receive image data (e.g., fused camera data and radar data); using the image data, calculate polynomial path data; using the image data, vehicle data, and uncertainty data, determine estimation path data; determine whether a vehicle-lane confidence level is less than or equal to a threshold; when the confidence level is greater than the threshold, provide lateral controller 42 with the polynomial path data; when the confidence level is less than or equal to the threshold, provide lateral controller 42 with the estimation path data; and iteratively execute the aforementioned instructions. Additional examples of instructions which may be used instead of and/or in addition to these examples, as well as sequences of instructions, are described in the one or more processes below.

Memory 64 may include any non-transitory computer usable or readable medium, which may include one or more storage devices or articles. Exemplary non-transitory computer usable storage devices include conventional hard disk, solid-state memory, random-access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 64 may store one or more computer program products which may be embodied as software, firmware, or other programming instructions executable by the processor 62.

Lateral controller 42 may be any suitable computing device that controls mechanical movement of a vehicle steering linkage. Controller 42 may comprise a so-called electronic control unit (ECU) 66 which includes a processor and memory—enabling lateral controller 42 to be programmed to execute programmed instructions which control the steering linkage. According to one example, in a partially or fully autonomous vehicle system (e.g., level 3, 4 or 5), the vehicle 12 may be steered by controller 42—i.e., there may be no human control during the mode. The steering linkage (not shown) may comprise a mechanical linkage, an electrical linkage (e.g., such as a drive-by-wire configuration) or a combination thereof.

Accordingly, controller 42 may receive an output from computer 40, and in response to receiving the output, controller 42 may control vehicle lateral movement. The output may comprise one or more electrical signals, packet data, or the like that comprise lane-correction data such as a lateral offset measurement and heading error measurement. As discussed above, the output may comprise polynomial path data or estimation path data. Other outputs from computer 40 are possible; however, in at least one example, computer 40 outputs (and controller 42 receives from computer 40) polynomial path data or alternatively estimation path data.

It should be appreciated that while computer 40 and lateral controller 42 are shown as separate electronic devices, in some examples, controller 42 and computer 40 could form part of the same computing device (e.g., embodied together in hardware, in software, a combination thereof, etc.). Thus, in some examples, mechanical steering control may be transmitted directly by a combined computer and lateral controller (via network connection 30) to the vehicle steering linkage, whereas in the illustrated example, computer 40 transmits lateral offset and heading error measurements to lateral controller 42 (which in turn, controls the vehicle steering linkage).

Turning now to the sensor suite 44, some examples of suite 44 comprise more or fewer electronic devices; thus, those shown in FIG. 2 are merely one example. Camera system 46 (of suite 44) may comprise one or more complementary metal oxide semiconductor (CMOS) devices, one or more charge-coupled devices (CCDs), one or more image intensifying devices, one or more thermal imaging devices, a combination thereof, or the like. According to at least one example, two camera devices of system 46 are positioned to view vehicle-forwardly (e.g., at least partially along +x-axis), and camera data received from these devices is provided to computer 40.

Radar system 48 may comprise one or more radar antennas (not shown) configured to scan at least partially vehicle-forwardly and determine two- and/or three-dimensional radar data. According to one example, data from the system 48 includes range direction, azimuth direction and elevation direction. One example of system 48 is a millimeter-wave radar system.

As will be explained in greater detail below, computer 40 (or another onboard computing system) may fuse together camera data from camera system 46 and radar data from system 48 (e.g., using an image-fusing algorithm). For example, camera data and radar data may be blended together and/or reconstructed into a single representation or into a common imaging data set that corresponds to the representation. The data set may comprise both high-resolution visual characteristics of objects surrounding vehicle 12 (e.g., color, gain, contrast, etc.) and high-resolution depth of those objects with respect to vehicle 12 (e.g., distance of object to vehicle 12). The response time of the camera system 46, the radar system 48, and the image-fusing algorithm may be suitable for lane detection at vehicle highway speeds. Accordingly, this fused sensor data may be used to calculate or otherwise determine the polynomial path and, in part, estimation path data, as explained more below.

Laser imaging system 50 may comprise any suitable laser scanning device which also may provide image or depth data input to computer 40. One non-limiting example of such a device is a light detection and ranging (LIDAR) device. System 50 is optional. When utilized, laser imaging data from system 50 may be substituted for radar data or alternatively used with camera data and radar data (e.g., fusing data from all three sources).

Inertial measurement units (IMUs) 52 may comprise any suitable electronic device that measures the vehicle's acceleration, angular rate movements, rotational rate movements, and/or the like. IMUs 52 may comprise one or more accelerometers, one or more gyroscopes, a combination thereof, or the like. IMU data may be used to calculate the polynomial path data and/or estimation path data, as described more below.

Steering control sensors 54 may comprise any sensors which measure wheel rotation and/or steering angle. Consequently, sensors 54 may comprise speed or angular speed sensors, steering angle sensors, a combination thereof, or the like. According to at least one example, sensor 54 forms part of an electronic stability control (ESC) system; however, this is merely an example. Steering control sensor data also may be used to calculate the polynomial path data and/or estimation path data, as described more below.

Figures 5, 5A:
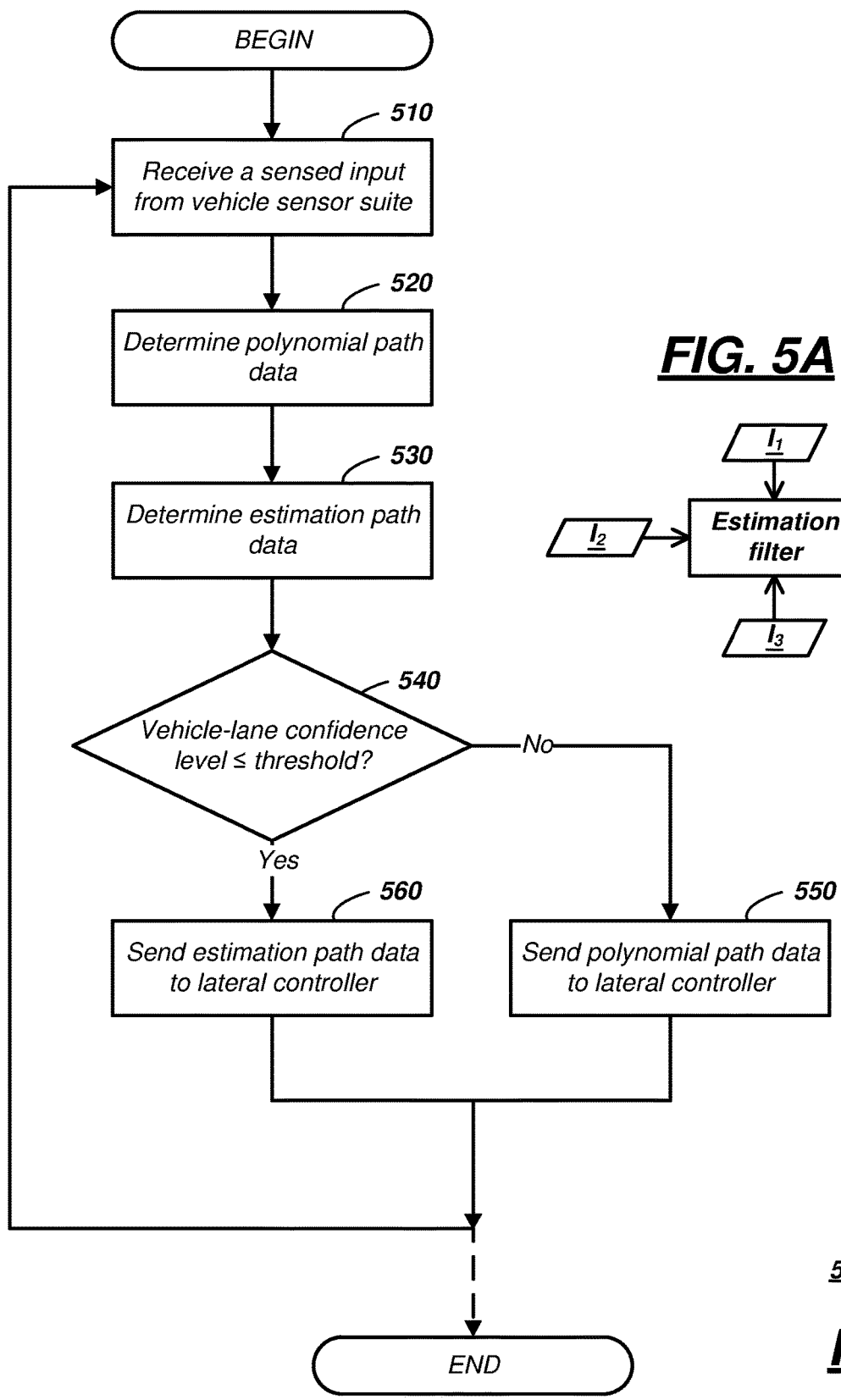
FIG. 5 is a flow diagram illustrating a steering control process for controlling the host vehicle using polynomial path data or estimation path data.
FIG. 5A illustrates a schematic diagram of an estimation filter that receives sensed inputs and yields estimation path data as an output.
Figure 6:
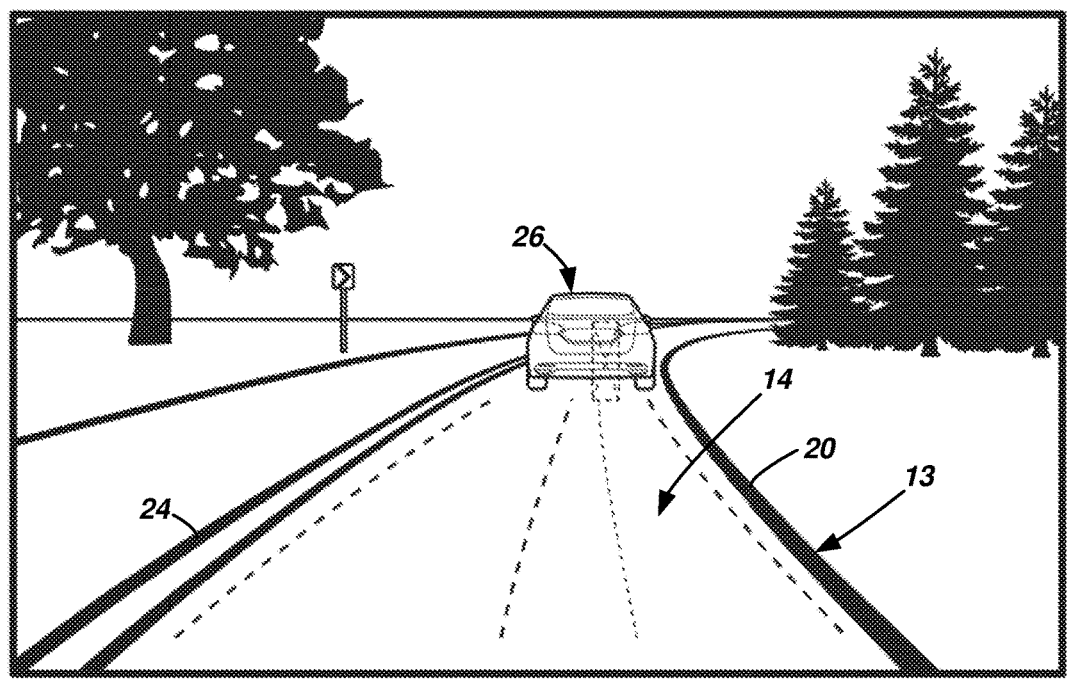
FIG. 6 illustrates a computerized representation of a target vehicle, a lane of a roadway, and a path of the host vehicle—within lane markers.
Figure 7:
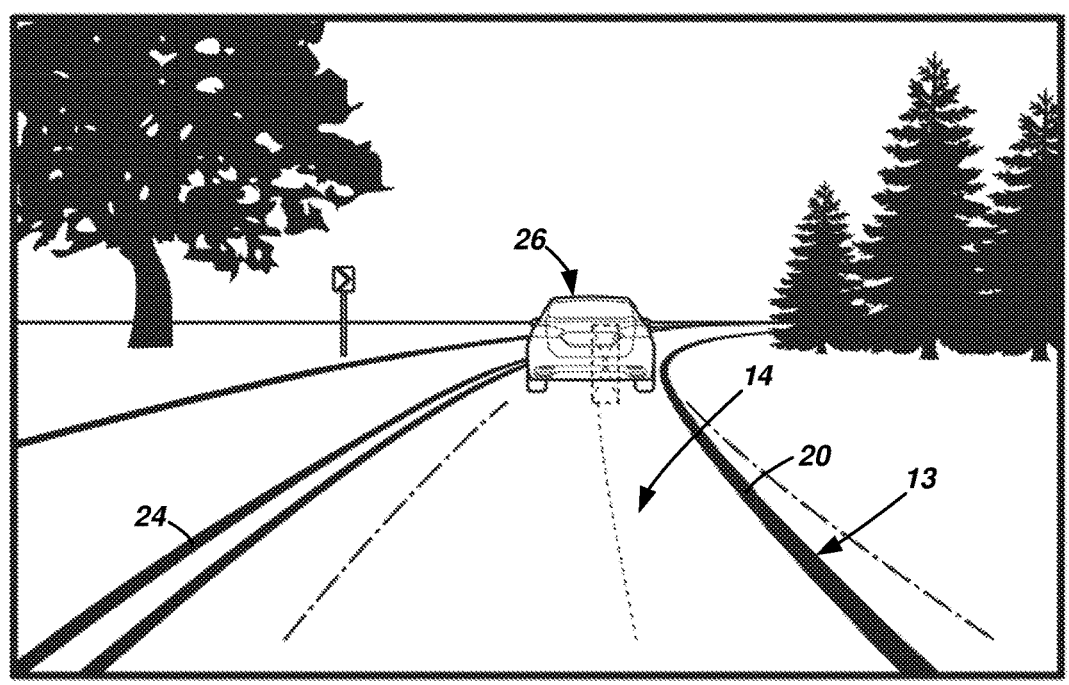
FIG. 7 illustrates a computerized representation of the target vehicle, the lane, and a path of the host vehicle at least partially outside of the lane markers.

Turning now to FIG. 5, a flow diagram of a process 500 of computer 40 providing one of two outputs to lateral controller 42 is described. In this exemplary process, the outputs comprise lateral offset data and heading error measurements so that lateral controller 42 may actuate the steering linkage in vehicle 12 and thereby control vehicle lateral position. In general, process 500 may comprise a plurality of instructions shown in the illustration and described below as logic blocks. The process may begin with block 510 wherein a sensed input is received at computer 40 from at least one sensor of the sensor suite 44. According to one exemplary implementation, the input comprises fused sensor data—e.g., a fusion of camera data from one or more cameras of system 46 and radar data from radar system 48.

The input received in block 510 may include information regarding primary object (PO) 26 (e.g., a target vehicle which host vehicle 12 is following—e.g., exemplified in FIGS. 1, 5-7), right-lane marker (RLM) 20, left-lane marker (LLM) 24, other roadway data, or a combination thereof. As used herein, a primary object is an object, which when moving, is moving with a similar heading as vehicle 12, and which is used by computer 40 of vehicle 12 to determine a confidence level that host vehicle 12 is positioned properly within a lane 13 of the roadway 14 (e.g., the assumption being that, if PO 26 is moving within RLM and LLM 20, 24, then if host vehicle 12 follows the path of PO 26, host vehicle 12 also will be positioned properly in lane 13—i.e., properly positioned between RLM and LLM 20, 24). As used herein, a lane marker is any identifier or indicia outlining where vehicle 12 is intended to be navigated in order to be spaced laterally from other vehicles on a roadway and/or in order to be legally-positioned while moving on roadway 14. It should be appreciated that not all roadways have lane markers 20, 24, and that some roadways will have fewer lane markers than others (e.g., a LLM 24 but not a RLM 20 or vice-versa). Non-limiting examples of lane markers 20, 24 include: a painted solid line on a roadway surface, a painted dashed line on the roadway surface, a combination of one or more painted dashed lines on the roadway surface and one or more painted solid lines on the roadway surface, thin film reflective adhesive on the roadway surface, a roadway curb extending upwardly from the roadway surface, a roadway shoulder, or the like. Thus, according to one example, from the sensed input received by computer 40 (in block 510), computer 40 may extract lane-positioning indicia.

In block 520 which follows, computer 40 may determine polynomial path data. According to one example, computer 40 may extract the lane-positioning indicia from the sensed input and use this to calculate coefficient values of a three- or more-degree curve-fitting polynomial that corresponds to a predicted path of vehicle 12. Thereafter, the polynomial may be used to extrapolate an adjustment to a lateral offset of vehicle 12 and/or an adjustment to vehicle heading angle (i.e., to determine a lateral offset measurement and a heading angle measurement).

According to the example of Equation (1), computer 40 may calculate coefficients for polynomial terms. For example, computer 40 may calculate: $a_0$, wherein $a_0$ is a numerical value of a dependent variable x to the zero power; $a_1$, wherein $a_1$ is a numerical value of the dependent variable x to the first power; $a_2$, wherein $a_2$ is a numerical value of the dependent variable x to the second power; and $a_3$, wherein $a_3$ is a numerical value of the dependent variable x to the third power. According to one example, computer 40 may determine the values of $a_0$, $a_1$, $a_2$, and $a_3$ using a curve-fitting algorithm that receives as input the fused sensor data and determines the coefficients based on identification of RLM 20, LLM 24 and/or PO 26.

$$y(x) = a_0 x^0 + a_1 x^1 + a_2 x^2 + a_3 x^3, \qquad \text{Equation (1)}$$

wherein, for example, when $a_0$, $a_1$, $a_2$, and $a_3$ each equal zero (0), then the lateral offset and heading angle measurements are zero (0), wherein, for example, when $a_1$, $a_2$, and $a_3$ each equal zero (0) and $a_0 < 0$, then the heading angle measurement is zero (0), but the lateral offset measurement corresponds to the value of $a_0$ [a linear path example, parallel to and offset from the x-axis], wherein, for example, when $a_0$, $a_2$, and $a_3$ each equal zero (0) and $a_1 > 0$, then the lateral offset measurement is zero (0) but the heading angle measurement corresponds to the value of $a_1$ [a linear path example, intersecting and diverging from the x-axis], wherein, for example, when $a_0$, $a_1$, and $a_3$ each equal zero (0) and $a_2 > 0$, then $a_2$ represents half of the path curvature $$\left(\text{i.e., } a_2 = \frac{1}{2} * \left.\frac{d^2 y}{dx^2}\right|_{x=0}\right)$$

[a quadratic path example, wherein the path curves away from the x-axis having characteristics of a quadratic polynomial], wherein, for example, when $a_0$, $a_1$, and $a_2$ each equal zero (0) and $a_3 > 0$, then $a_3$ represents one sixth of the path curvature $$\left(\text{i.e., } a_3 = \frac{1}{6} * \left.\frac{d^3 y}{dx^3}\right|_{x=0}\right)$$

Figure 4:
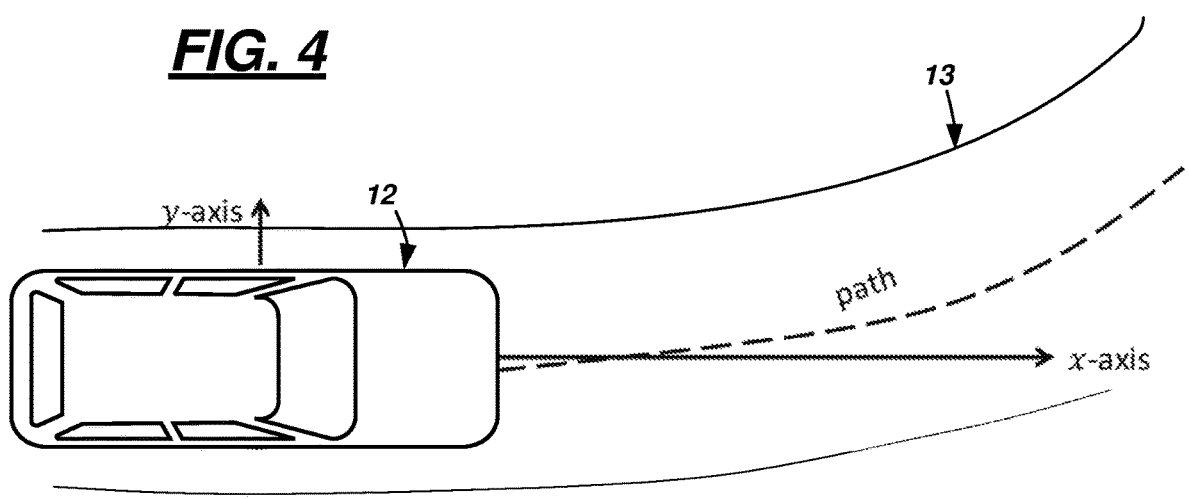
FIG. 4 is a schematic view of a general example of a path of the host vehicle determined using a curve-fitting polynomial.

[a third-degree polynomial path example, wherein the path curves away from the x-axis having characteristics of a third-degree polynomial], and wherein, for example, when $a_0 < 0$, $a_1 > 0$, $a_2 \cong 0$, and $a_3 > 0$, then y(x) represents a path curvature similar to that shown in FIG. 4) [a general example of a third-degree polynomial path].

According to another non-limiting example, computer 40 may determine a curve-fitting polynomial and coefficients of the terms thereof according to the techniques similar to or set forth in U.S. Pat. Publication No. 2017/0197615, the contents of which are hereby incorporated by reference in their entirety. Still other examples are possible.

Figure 3:
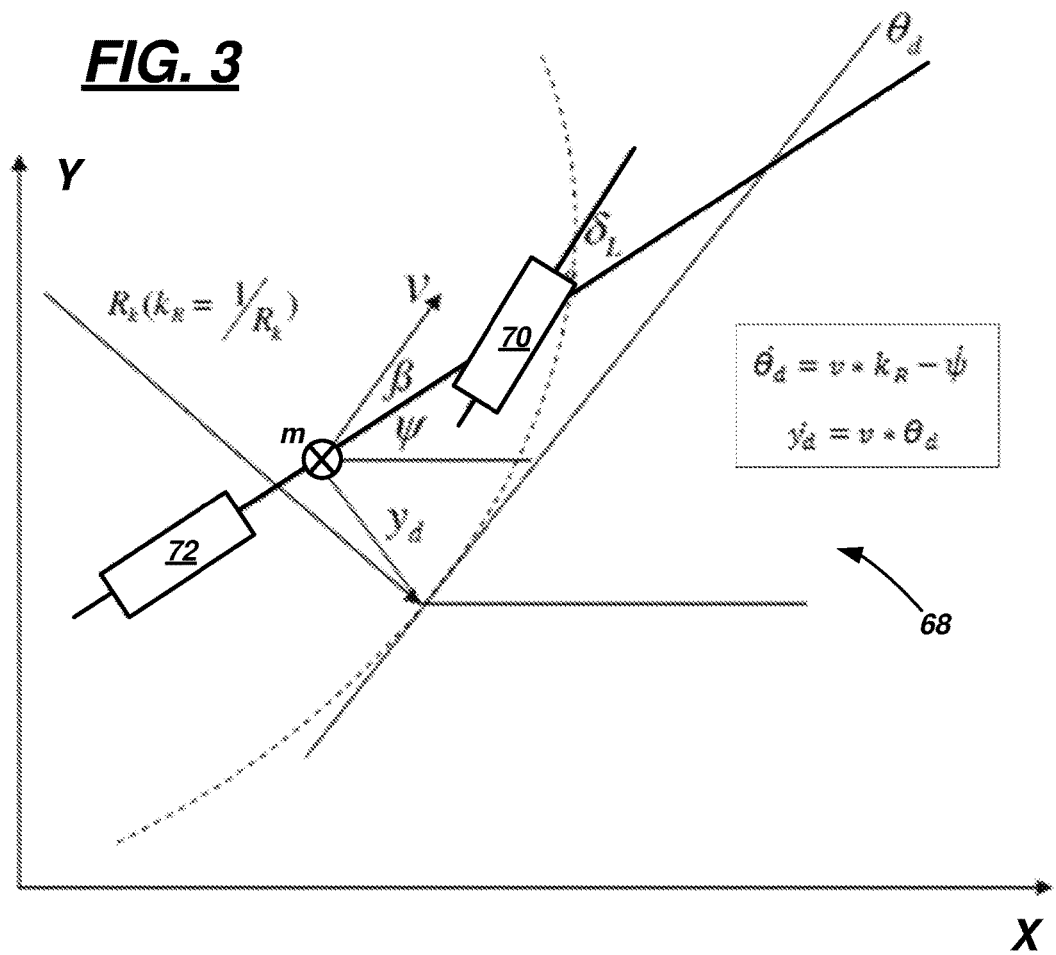
FIG. 3 is a graphical depiction of a bicycle model for determining a path of the host vehicle using the model and an estimation filter.

Turning now to block 530 (see also FIG. 5A), computer 40 may determine estimation path data using sensed input, a bicycle model 68 shown in FIG. 3, and an estimation filter 69 (e.g., a Kalman filter is used here for purposes of illustration). According to one example, the inputs received by the Kalman filter 69 include sensed input $I_1$, kinematics input $I_2$ and in some instances, the curve-fitting polynomial data $I_3$ (determined in block 520). Sensed input $I_1$ may comprise fused sensor data from camera system 46 and radar system 48 (e.g., including roadway curvature information extracted and/or derived from the fused sensor data), vehicle yaw rate data from IMUs 52, and vehicle speed data from steering control sensors 54. Kinematics input $I_2$ may comprise calculated data using the bicycle model 68 (e.g., as described below, a rate of change in steering angle $\dot{\theta}_d$ of a vehicle wheel and a rate of change in vehicle side drift $\dot{y}_d$ (e.g., side drift velocity)). Using data from the curve-fitting polynomial ($I_3$) as an input to the Kalman filter is optional; this will not be re-described below (as it was described above). The Kalman filter 69 thereafter may be used to calculate output O that comprises estimation path data, which includes at least a lateral offset measurement and a heading angle measurement. Of course, the values of these measurements in some circumstances are likely to differ from those determined by the curve-fitting polynomial of Equation (1)—i.e., as illustrated in FIGS. 9-14, the estimation data (or components thereof) may minimize a rate of change in vehicle path—e.g., effectively smoothing vehicle steering instructions of the controller 42 to the vehicle steering linkage. For instance, in accordance with the problem shown in FIG. 1, when estimation path data is used instead of polynomial path data, the vehicle 12 may not jump laterally to the right when the RLM 20 diverged (e.g., any movement of the vehicle 12 rightwardly may be subtle so that vehicle 12 remains spaced between LLM 24 and where the RLM 20 would be if it had extended parallel to LLM 24 rather than diverged).

Turning now to the bicycle model 68 shown in FIG. 3, the model illustrates a vehicle front wheel 70 and a vehicle rear wheel 72—e.g., on the same side of the vehicle 12—and a simplified center of mass m of vehicle 12 (i.e., a center of mass between those two wheels 70, 72). In the illustration, the wheels 70, 72 are oriented with respect to an X-axis and a Y-axis—e.g., representing a vehicle path along roadway 14. FIG. 3 also illustrates a vehicle velocity (v), a radius of curvature ($R_k$), a curvature $$\left(k_R, \text{wherein } k_R = \frac{1}{R_k}\right),$$

a steering angle ($\Theta_d$) (between a tangent at radius $R_k$ and an angular position of rear wheel 72), a vehicle sideslip angle ($\beta$), a vehicle yaw ($\Psi$), a side drift displacement ($y_d$), and a steering angle ($\delta_L$) of front wheel 70 relative to rear wheel 72 (this simplified model assumes no steering input to rear wheel 72). Equations (2) and (3) define a lateral offset measurement calculation and a heading angle measurement calculation, respectively.

$$\dot{y}_d = v^* \Theta_d, \quad \text{Equation (2)}$$

wherein $\dot{y}_d$ is a side drift velocity (e.g., a rate of change of side drift displacement $y_d$).

$$\dot{\theta}_d = v^* k_R - d\Psi, \quad \text{Equation (3)}$$

wherein $\dot{\theta}_d$ is a rate of change in steering angle $\Theta_d$ (e.g. here, with respect to front wheel 70).

According to one example, the Kalman filter 69 may comprise a prediction step and a weighting step. In the prediction step, the filter 69 may determine a plurality of lateral offset and corresponding heading angle measurements, as well as uncertainty values corresponding to each set of lateral offset and heading angle measurements. According to one example, the uncertainty values may comprise a scores based on a respective accuracy probability. In the weighting step, subsequent lateral offset and heading angle measurements may be received, and the earlier measurements may be updated using a weighted average, wherein less weight is given to values having correspondingly higher uncertainty values. This is merely one example; other estimation values may be used. Further, the inputs to the Kalman filter 69 may differ in other examples.

Once computer 40 has determined polynomial path data (block 520) and estimation path data (block 530), then process 500 may proceed to block 540. In block 540, computer 40 may determine whether a vehicle-lane confidence is less than or equal to a predetermined threshold. According to one example, confidence level may be binary (e.g., High or Low). Non-limiting examples of confidence levels are set forth in Table I, shown below.

TABLE I

| LLM (24) | RLM (20) | PO (26) | Confidence Level |
|---|---|---|---|
| detection LOW | detection LOW | detection LOW | Low |
| detection LOW | detection LOW | detection HIGH | Low |
| detection LOW | detection HIGH | detection LOW | Low |
| detection LOW | detection HIGH | detection HIGH | Low |
| detection HIGH | detection LOW | detection LOW | Low |
| detection HIGH | detection LOW | detection HIGH | Low |
| detection HIGH | detection HIGH | detection LOW | Low |
| detection HIGH | detection HIGH | detection HIGH | High |

Table I illustrates an example wherein detections of the respective LLM 24, RLM 20, and PO 26 are either high detection or low detection. Consequently, when the detections for each of LLM 24, RLM 20, and PO 26 are high, then the confidence level determined by computer 40 is High. High detection means detection of a predetermined threshold quantity and/or resolution of features, edges, or the like (e.g., suitable to identify the respective lane marker or primary object), and low detection means detection of something less than this threshold quantity and/or resolution. In the exemplary table, detection is labeled high or low; however, this is an example. For instances, detection could be low, medium, or high—or comprise more than three categorizations. Further, in at least some examples, computer 40 still may determine a High confidence level in spite of a detection (of LLM 24, RLM 20, or PO 26) being less than a detection high (e.g., being a detection medium or even a detection low). Thus, Table I is not meant to be limiting; instead, it is an example of how a confidence table may be preconfigured, stored in memory 64, and used to determine whether a confidence level in block 540 is less than or equal to a predetermined threshold. Accordingly, in this example, unless computer 40 determines a high detection of each of the LLM 24, the RLM 20, and the primary object 26, then the confidence is less than or equal to the threshold.

When the confidence level (in block 540) is greater than the threshold, then process 500 may proceed to block 550.

And when the confidence level (in block 540) is less than or equal to the threshold, then process 500 may proceed to block 560.

In block 550, computer 40 provides an output to lateral controller 42 that includes the polynomial path data. Here, the confidence level is high enough that controller 42 can instruct or otherwise control the steering linkage to maintain the vehicle 12 within lane 13 using polynomial path data derived from the fused sensor data. Following block 550, the process 500 may end or loop back to block 510 and repeat. Typically, the process repeatedly loops back to block 510 while the transmission of the vehicle 12 is not in PARK.

In block 560, computer 40 provides an output to lateral controller 42 that includes the estimation path data—e.g., an output of the Kalman filter implemented using computer 40. Here, the confidence level is low enough that—if controller 42 used the polynomial path data—the passenger experience may be negatively affected, as the vehicle 12 may suddenly veer right or left based on an inability to sufficiently identify lane indicia. Thus, in block 560, computer 40 provides the estimation path data determined in block 530 to controller 42, and controller 42 instructs or otherwise controls the steering linkage to maintain the vehicle 12 within lane 13 using the estimation path data.

As discussed above, both the polynomial path data and the estimation path data may comprise lateral offset and heading angle offset measurements; however, data communicated by the lateral controller may be any suitable command, instruction, or the like that is based on those lateral offset and heading angle offset measurements (e.g., it need to be the lateral offset and heading angle offset measurements themselves).

Following block 560, the process 500 may end or loop back to block 510 and repeat. Similar to that discussed above, typically, the process loops back to block 510 while the transmission of the vehicle 12 is not in PARK.

Figure 8:
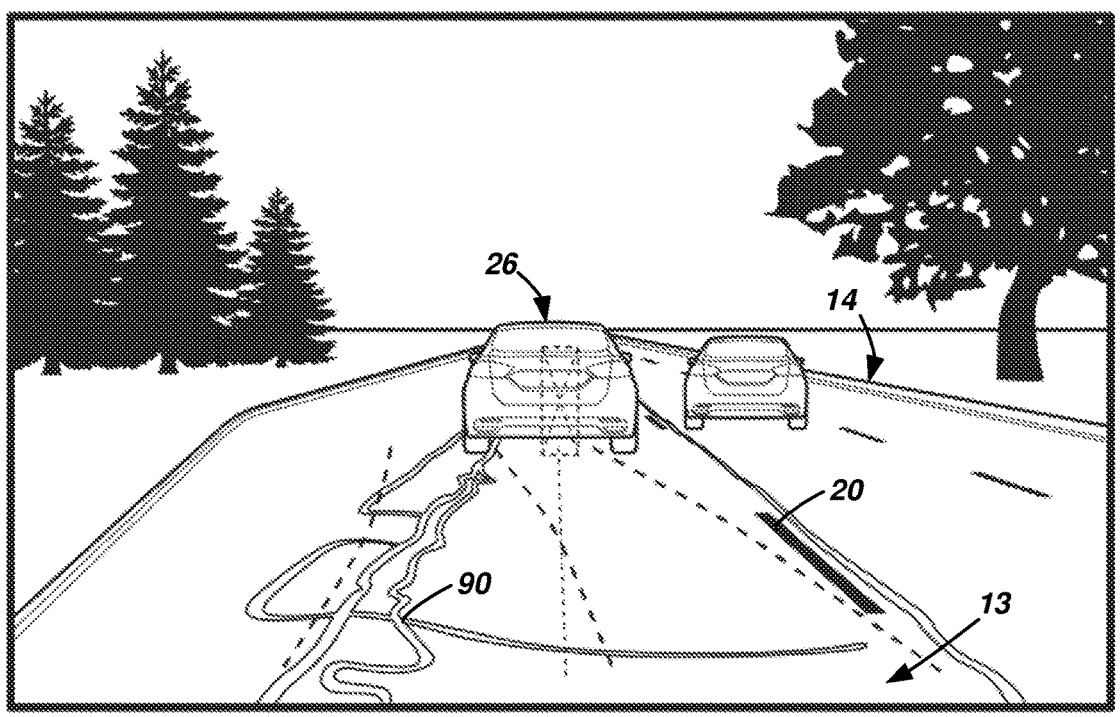
FIG. 8 illustrates a computerized representation of another target vehicle, a primary lane of a roadway in which a left lane marker disappears (and which lane contains the host and target vehicle), an exit lane which extends from the primary lane, and a path of the host vehicle extending toward the exit lane.
Figure 9:
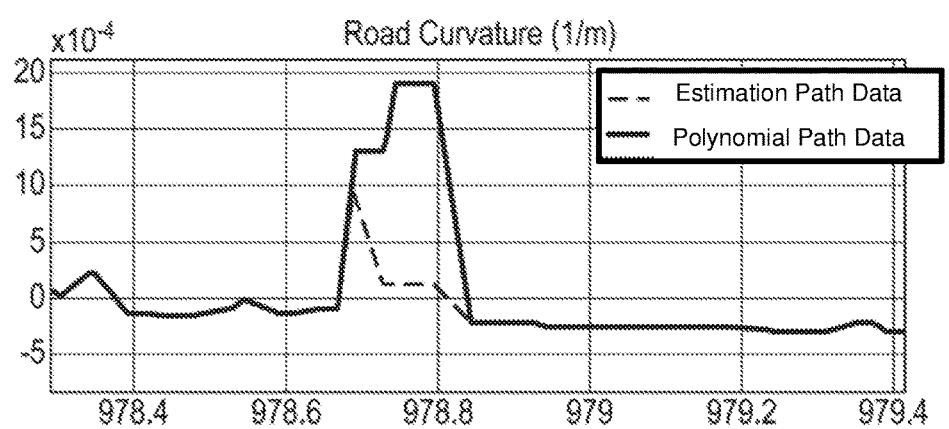
FIG. 9 illustrates a graphical depiction of an interval of sensor data that comprises roadway curvature measurements—more particularly, illustrating polynomial path data and estimation path data.
Figure 10:
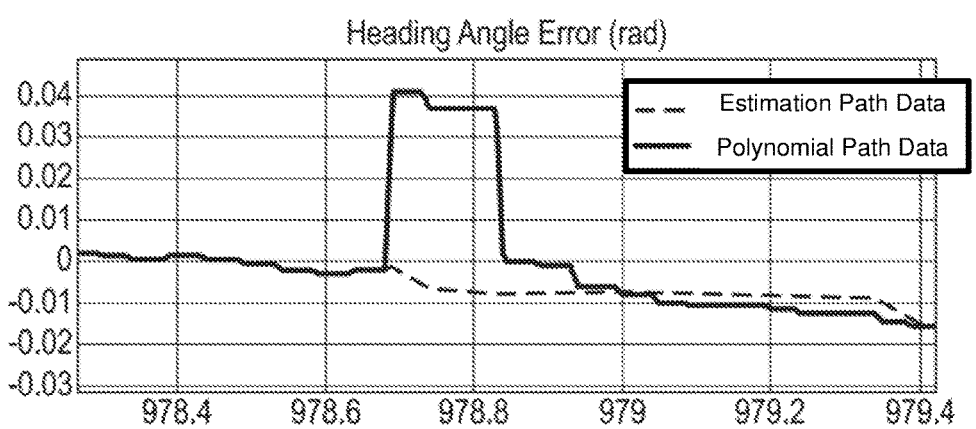
FIG. 10 illustrates a graphical depiction of the interval of FIG. 9, the sensor data comprising heading angle error measurements—more particularly, illustrating polynomial path data and estimation path data.
Figure 11:
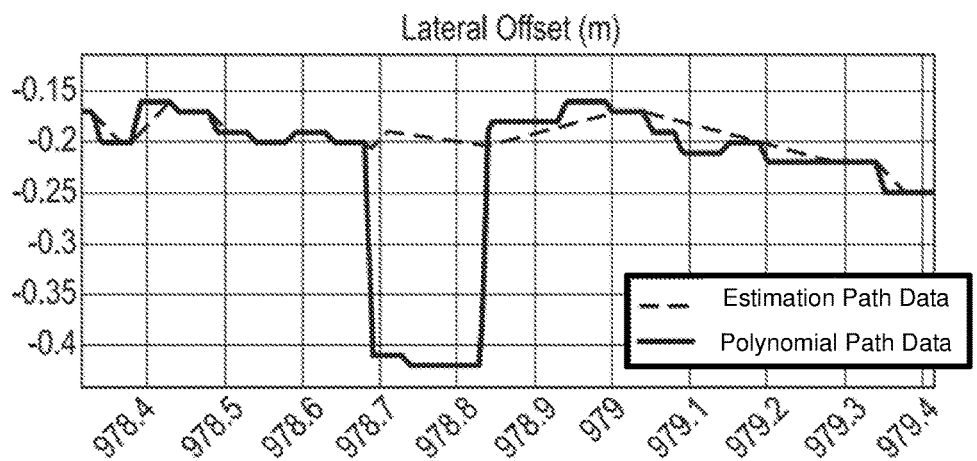
FIG. 11 illustrates a graphical depiction of the interval of FIG. 9, the sensor data comprising lateral offset measurements—more particularly, illustrating polynomial path data and estimation path data.

FIGS. 9-11 correspond to an example wherein vehicle 12 approaches an exit lane e.g., such as shown in FIG. 1 or FIG. 8. More particularly, FIG. 9 illustrates road curvature data, over a period of milliseconds, that corresponds to estimation path data and also polynomial path data; FIG. 10 illustrates heading angle measurements that correspond to the road curvature data of FIG. 9; and FIG. 11 illustrates lateral offset measurements that correspond to the road curvature data of FIG. 9 and the heading angle measurements of FIG. 10.

In the examples of FIGS. 9-11, a right or left lane marker (respectively) may diverge from its counterpart lane marker and/or disappear. This may cause a sudden drop in confidence level, and without use of the estimation path data, vehicle 12 operating in an autonomous mode may veer right or left—as illustrated by the spike in polynomial path data. Tar markings, patches, or other road-repair indicia 90—as shown in FIG. 8—further may result in confusion as the computer 40 attempts to determine what contrast lines demarcate the lane 13. However, as shown in FIGS. 9-11, the estimation path data from a Kalman filter or the like may smooth or eliminate the sudden heading angle change and/or sudden lateral offset change. Thus, when the estimation path data is provided to the controller 42, vehicle steering control may be smoothed.

Figure 12:
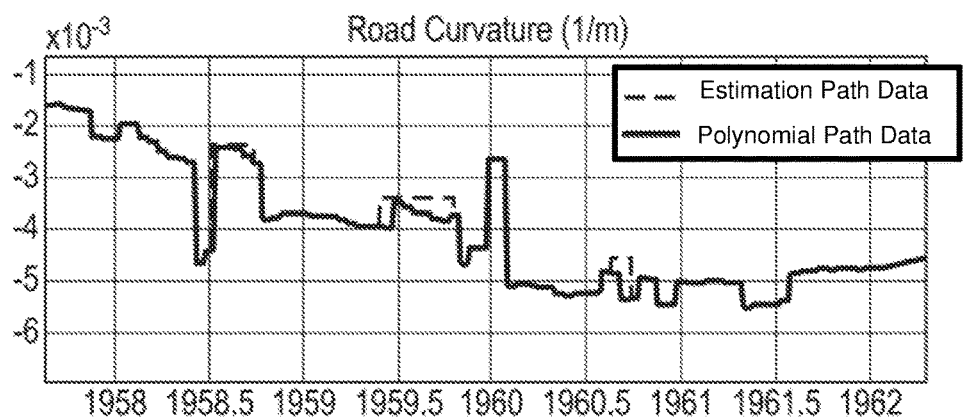
FIG. 12 illustrates a graphical depiction of another interval of sensor data that comprises roadway curvature measurements—more particularly, illustrating polynomial path data and estimation path data.
Figure 13:
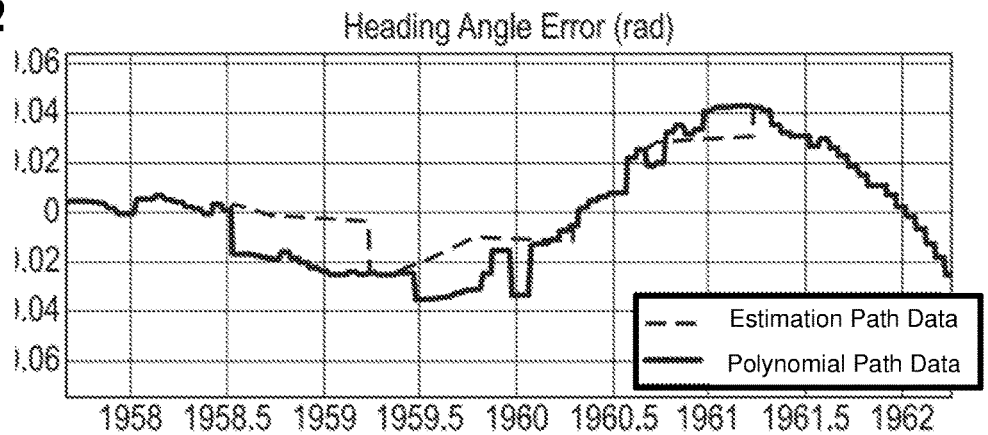
FIG. 13 illustrates a graphical depiction of the interval of FIG. 12, the sensor data comprising heading angle error measurements—more particularly, illustrating polynomial path data and estimation path data.
Figure 14:
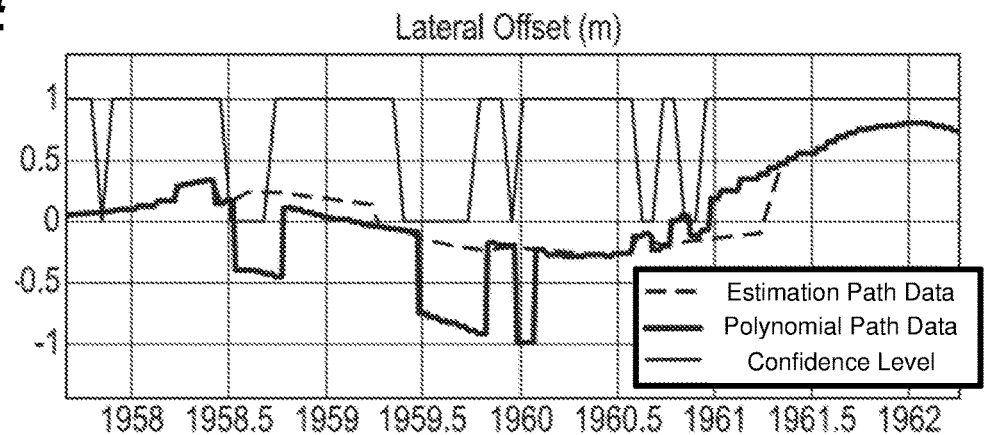
FIG. 14 illustrates a graphical depiction of the interval of FIG. 12, the sensor data comprising lateral offset measurements—more particularly, illustrating polynomial path data and estimation path data.

FIGS. 12-14 illustrate a similar situation as that shown in FIGS. 9-11, except that FIG. 14 also illustrates corresponding changes in confidence level, as determined by computer 40. Again, the roadway curvature data, the heading angle measurements, and the lateral offset measurements may result from sudden changes in lane marker visibility, vehicle 12 moving between a shadowed region and an unshadowed region (e.g., a shadow being cast upon the lane markers 20, 24 (e.g., such as when vehicle 12 passes beneath an overpass or within a tunnel)), sudden changes in ambient lighting causing glare on the lane markers 20, 24, disappearance of the primary object 26 (due to hills, turns, or the object 26 taking a different route than vehicle 12), and the like.

FIG. 12 illustrates road curvature data, over a period of milliseconds, that corresponds to estimation path data and also polynomial path data; FIG. 13 illustrates heading angle measurements that correspond to the road curvature data of FIG. 12; and FIG. 14 illustrates lateral offset measurements that correspond to the road curvature data of FIG. 12 and the heading angle measurements of FIG. 13.

As shown in FIGS. 12-14, the estimation path data from a Kalman filter or the like may smooth or eliminate the sudden heading angle change and/or sudden lateral offset change. Thus, when the estimation path data is provided to the controller 42, vehicle steering control may be smoothed. Further, FIG. 14 illustrates that drops in confidence level correspond with periods wherein the use of the estimation path data suitably provides a smoother vehicle passenger driving experience. Accordingly, as explained above in process 500, the estimation path data may be output by the computer 40 to the lateral controller 42 in these instances.

As illustrated by the data in FIG. 14, it will be appreciated that computer 40 also may determine the confidence level based on a change of status of one of the lane indicia. For example, if a right lane marker 20 status is detected (e.g., see also Table I), and it suddenly changes to an undetected status, then computer 40 may determine that the confidence level has dropped below the threshold. Changes in the detection status of the left lane marker 24 or the primary object 26 may result in a similar determination that the confidence level is below the threshold.

Thus, there has been described a steering control system for a vehicle. The system includes a computer that determines polynomial path data and estimation path data. When a vehicle-lane confidence level is less than a predetermined threshold, then the system uses estimation path data to control vehicle steering. And when the confidence level is greater than the threshold, the system may use the polynomial path data to control vehicle steering.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random-access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method, comprising:
   receiving sensed input from a vehicle sensor suite;
   using the input, providing a first output upon determining that a vehicle-lane confidence level is above a threshold, the vehicle-lane confidence level being a quantity of data of the sensed input corresponding to a lane marker or a target vehicle; and
   providing a second output upon determining that the vehicle-lane confidence level is less than or equal to a threshold;
   wherein the first and second outputs comprise lane-correction data, wherein the second output is determined using an estimation filter that uses a bicycle model.

2. The method of claim 1, wherein the input comprises radar data and camera data.

3. The method of claim 2, wherein the radar and camera data are fused into a single representation that comprises lane markers on a roadway.

4. The method of claim 1, wherein the first output is determined by calculating coefficients for a curve-fitting polynomial.

5. The method of claim 1, wherein the filter is a Kalman filter.

6. The method of claim 1, wherein the bicycle model uses vehicle yaw rate, vehicle speed, and a roadway curvature measurement.

7. The method of claim 1, wherein determining the level further comprises analyzing the input to determine an identification status of: a right lane marker on a roadway, a left lane marker on the roadway, a primary object moving on the roadway, or a combination thereof.

8. The method of claim 7, wherein determining that the level further comprises determining that a status of one or more of the right lane marker, the left lane marker, or the object has changed between a detected status and an undetected status.

9. The method of claim 7, wherein the first output is provided when the statuses of each of the right lane marker, the left lane marker, and the primary object is detected.

10. The method of claim 7, wherein the second output is provided when the statuses of one or more of: the right lane marker, the left lane marker, and the primary object is undetected.

11. The method of claim 1, wherein the level is based on an identification within the input of: a right lane marker, a left lane marker, a primary object moving on a roadway, a combination thereof, or an absence of one or more of: the right lane marker, the left lane marker, or the object.

12. The method of claim 1, wherein the data comprises a lateral offset measurement and a heading offset measurement.

13. The method of claim 1, wherein the input comprises camera data at a host vehicle, wherein the level is less than the threshold based on a change in gain or contrast in the camera data.

14. The method of claim 13, wherein the change is based on at least one of: the vehicle moving, on a roadway, between a shadowed region and an unshadowed region; a right lane marker or a left lane marker, on the roadway, terminating; one of the right lane marker or the left lane marker diverging from parallel; or a presence of markings on the roadway other than lane markers.

15. The method of claim 14, wherein the markings comprise roadway repairs or patches.

16. A system, comprising:
a processor; and
memory storing instructions executable by the processor, the instructions comprising, to:
receive sensed input from a vehicle sensor suite;
using the input, provide a first output upon determining that a vehicle-lane confidence level is above a threshold, the vehicle-lane confidence level being a quantity of data of the sensed input corresponding to a lane marker or a target vehicle; and
provide a second output upon determining that a vehicle-lane confidence level is less than or equal to a threshold;
wherein the first and second outputs comprise lane-correction data, wherein the second output is determined using an estimation filter that uses a bicycle model.

17. The system of claim 16, wherein the first output is determined by calculating coefficients for a curve-fitting polynomial.

18. The system of claim 16, wherein determining the level further comprises analyzing the input to determine an identification status of: a right lane marker on a roadway, a left lane marker on the roadway, a primary object moving on the roadway, or a combination thereof.

19. The system of claim 16, wherein the bicycle model uses vehicle yaw rate, vehicle speed, and a roadway curvature measurement.

* * * * *